J. H. STEPHENS.
HOSE COUPLING.
APPLICATION FILED JUNE 16, 1908.
969,216.
Patented Sept. 6, 1910.
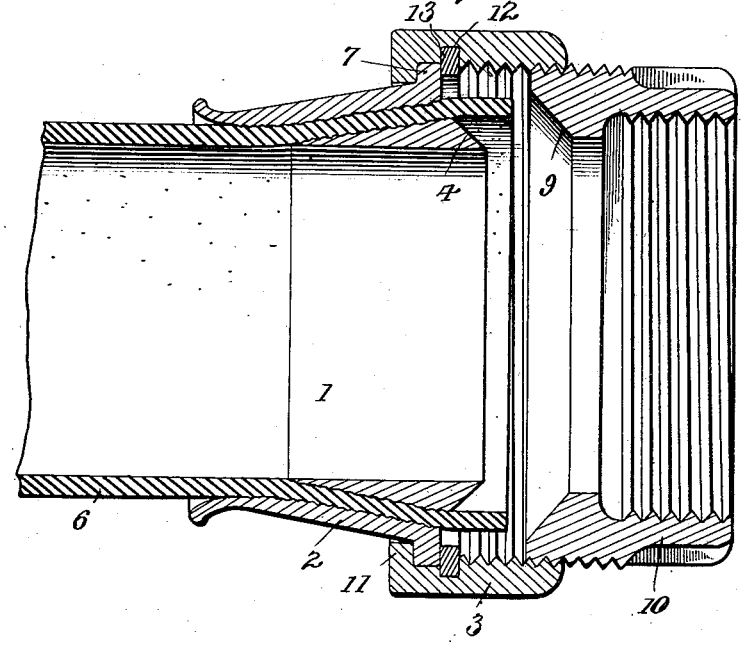
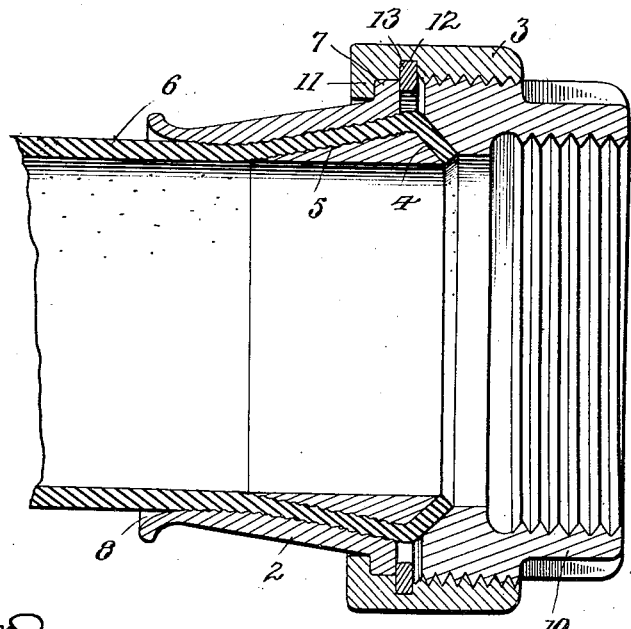
Witnesses
Inventor
John H. Stephens
By Lacey, Attorneys

UNITED STATES PATENT OFFICE.

JOHN H. STEPHENS, OF VERNON, TEXAS.

HOSE-COUPLING.

969,216.  Specification of Letters Patent.  Patented Sept. 6, 1910.

Application filed June 16, 1908. Serial No. 438,789.

*To all whom it may concern:*

Be it known that I, JOHN H. STEPHENS, citizen of the United States, residing at Vernon, in the county of Wilbarger and State of Texas, have invented certain new and useful Improvements in Hose-Couplings, of which the following is a specification.

The present invention provides a coupling designed most especially for fire hose which must resist heavy pressure and a pulling strain, the intent being to secure a tight joint between two sections of hose when coupled and to prevent the hose drawing from the coupling when under tension.

The invention also aims to supply a coupling involving few parts and a comparatively cheap and light structure consistent with serviceability and efficiency and which may be easily and conveniently handled both in coupling and uncoupling.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a longitudinal section of a hose coupling embodying the invention, showing the relation of the parts before the coupling is tightened. Fig. 2 is a view similar to Fig. 1, showing the disposition of the parts after the coupling has been tightened.

Corresponding and like parts are referred to in the following description and indicated in both views of the drawing by the same reference characters.

The coupling comprises an expanding ring 1, a coupling member 2 and a swivel connection 3. The expanding ring 1 is tapered throughout its length to a knife or feather edge at its inner end. The outer end of the expanding ring is beveled, as indicated at 4. Annular grooves or fine ribs 5 are formed upon the outer surface of the expanding ring and are intended to make positive engagement with the hose 6 so as to prevent slipping when the parts are assembled and properly connected. The expanding ring is of wrought metal so as to admit of its expansion without rupture.

The coupling member 2 is provided at one end with an outer flange 7 and its opposite end is flared, as indicated at 8, the purpose being to prevent the formation of a sharp corner which would tend to cut or weaken the hose by being bent thereover in use. The coupling member 2 flares throughout its length toward its outer end, the inclination corresponding to the taper or inclination of the expanding ring 1. The hose 6 has its end portion clamped between the expanding ring 1 and the coupling member 2, the ring 5 being expanded by a suitable tool to insure the firm gripping of the hose between it and the coupling member 2. The parts 1 and 2 are of such relative diameters that when the end of the hose is clamped between them, the front end of the coupling member terminates about in the plane of the beveled end of the expanding ring, thereby leaving the extremity of the hose projecting a short distance in front of the coupling member free so as to be deflected over the beveled end 4 of the expanding ring and be confined between said beveled end and an inner beveled shoulder 9 of a coöperating coupling member 10, thereby obviating the necessity for a packing ring, the projecting end of the hose serving this purpose, as clearly indicated in Fig. 2.

The swivel connector 3 consists of a ring or band having an inner flange 11 at one end to engage over the outer flange 7 of the coupling member 2. The swivel connector is threaded to within a short distance of the inner flange 11 to make connection with the outer end portion of the coupling member 10. The function of the swivel connector 3 is to couple or unite the members 2 and 10. An inner annular groove 12 is provided upon the inner side of the part 3 a short distance from the flange 11 and receives a ring 13 which is sprung therein and confines the outer flange 7 between it and the flange 11 so as to hold the parts 3 and 2 in proper position. The ring 13 is preferably of metal and is split so as to spring into the annular groove 12 and become seated therein.

The coöperating member 10 may be a ring for connecting the hose to a hydrant, plug or other water fixture, the same consisting of a member fitted to the end of the hose to admit of the coupling of two hose sections when it is required to join the same to provide a hose of required length.

It is to be particularly noted that the apex of the beveled end 4 of the expanding ring 1 registers with the annular groove 12 in the interior wall of the swivel connector 3, whereby when the coupling member 10 is screwed into the swivel connector 3 it will clamp the projecting end of the hose between the beveled walls 4 and 9, the hose will be pinched between such walls and by expansion form an annular exterior bead within the groove 12 so as to assist in producing a water tight joint.

Having thus described the invention, what is claimed as new is:

In a coupling of the character described, the combination of a hose pipe, a ring mounted within the end of the pipe, with the pipe projecting beyond the outer end of the ring, said ring being enlarged from its inner end toward its outer end and formed at such outer end with a beveled exterior wall, a coupling member encircling the hose pipe and coacting with the ring to tightly clamp the hose between the coupling member and the ring, said coupling member being formed at its outer end with an exterior annular flange, a swivel connector formed at its inner end with an inturned flange taking over the flange of the coupling member, said swivel connector being formed with an interior annular groove, a split ring mounted within the groove and holding between it and the flange of the swivel connector the flange of the coupling member, the inner circumferential wall of said split ring being spaced from the hose pipe, and another coupling member adapted to screw into the swivel connector and formed at its outer end with a beveled interior wall corresponding to the beveled exterior wall of the first named ring, said two walls binding between them the projecting end portion of the hose pipe, the apex of the beveled wall of the first named ring registering with the inner groove of the swivel connector whereby the hose pipe will be permitted to expand in the space between said apex and the inner circumferential wall of the split ring, as and for the purpose set forth.

In testimony whereof I affix my signature in presence of two witnesses.

JOHN H. STEPHENS. [L. S.]

Witnesses:
V. B. HILLYARD,
W. N. WOODSON.